June 14, 1949.  G. V. WOODLING  2,472,872
FLARELESS TUBE COUPLING
Filed June 20, 1947
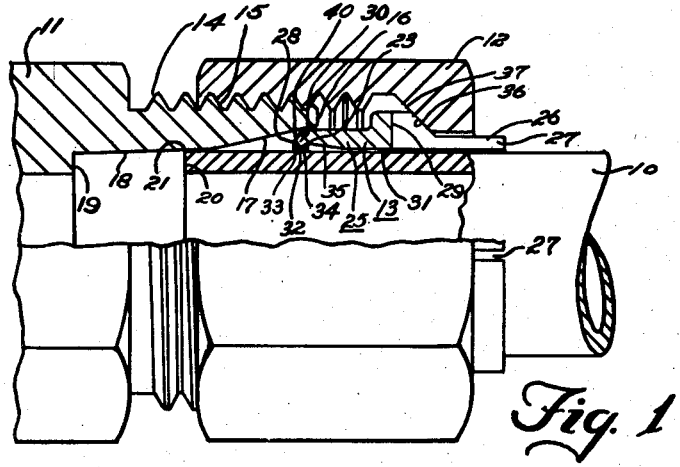
Fig. 1
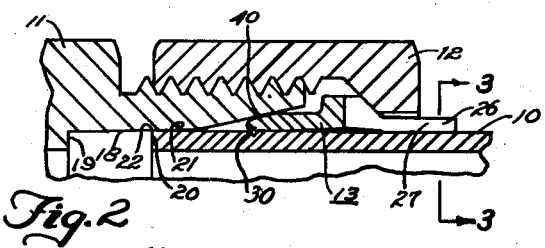
Fig. 2
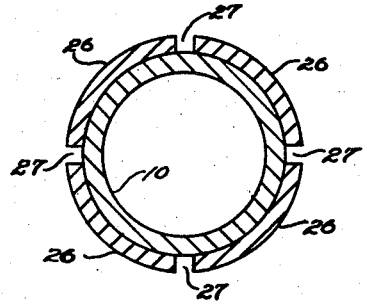
Fig. 3
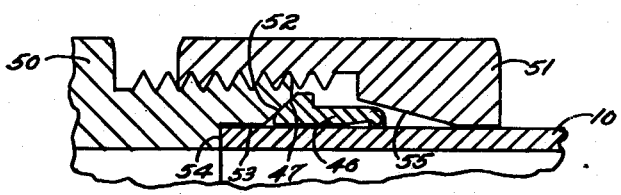
Fig. 4
Fig. 5
INVENTOR.
George V. Woodling.

Patented June 14, 1949

2,472,872

UNITED STATES PATENT OFFICE 2,472,872

FLARELESS TUBE COUPLING

George V. Woodling, Cleveland, Ohio

Application June 20, 1947, Serial No. 755,833

3 Claims. (Cl. 285—122)

My invention relates to tube couplings and more particularly to tube couplings of the non-flare type having a contractible sleeve for engaging the tube.

An object of my invention is to provide a first sealing engagement by pressing the end of the tube into a tapered counterbore of a coupling body and a second sealing engagement by pressing a contractible sleeve between the tube and a tapered flared mouth leading outwardly toward the end of the coupling body from the tapered counterbore.

Another object of my invention is to provide, in a tube coupling of the non-flare type, a connector body having a tapered counterbore to wedgingly receive the end of the tube and a tapered flared mouth leading outwardly toward the end of the coupling body from the tapered counterbore to receive a contractible sleeve mounted around and adapted to be contracted against the tube.

Another object of my invention is the provision of a contractible sleeve for a non-flare coupling, in which the sleeve has a readily contractible portion to grip the tube and a substantially noncontractible portion to limit the degree that the contractible portion may grip the tube.

Another object of my invention is to provide a contractible sleeve constructed of steel capable of being quench hardenable throughout its entire mass and thereafter tempered or drawn back to a hardness value sufficient to permit the leading marginal end section to be cammed or deflected inwardly against the tube but to prevent the section next adjacent the leading marginal end section from contracting inwardly to provide a "hit home" feeling to the tightening of the coupling nut.

Another object of my invention is the provision of a non-flare coupling having a contractible sleeve which gives a "hit home" feeling to the tightening of the nut and yet permits the sleeve to be re-set upon each repeated assembling of the coupling.

More specifically, an object of my invention is to provide, in a tube coupling of the non-flare type, a contractible sleeve disposed to be pressed into an internal annular cam surface for making engagement with a tube as the nut of the coupling is tightened, the sleeve comprising a continuous annular body constructed of steel capable of being quench hardenable throughout its entire mass and thereafter tempered or drawn back to a hardness value greater than that of the tube and having a readily contractible portion and a substantially non-contractible portion, both of which portions being adapted to be pressed against the internal annular cam surface, the contractible portion being disposed at the leading marginal end of the sleeve and being adapted to cam or deflect inwardly against the tube as the sleeve is initially pressed into the internal cam surface for gripping the tube, the substantially noncontractible portion being disposed next adjacent to and merging with the contractible portion and resisting further inward contraction of the sleeve, the resisting action limiting the amount that the sleeve may be pressed into the internal annular cam surface and thereby producing a "hit home" feeling to the tightening of the nut.

Another object of my invention is to provide a sleeve having an internal annular rib disposed at the leading marginal end thereof, whereby the leading end of the sleeve including the rib may be cammed or deflected inwardly against the tube.

Another object of my invention is the provision of a sleeve having an internal annular rib at the leading end thereof and having a minimum wall thickness next adjacent the rearward side of the rib, whereby a hinged action is produced so that the leading end of the sleeve and the rib may be readily cammed or deflected inwardly against the tube notwithstanding the fact that the sleeve is constructed of a heat treated, hardened alloy steel having a high carbon content.

Another object of my invention is to provide a sleeve having an internal relief bore provided with a longitudinally extending surface disposed next adjacent and on the rearward side of the rib, whereby when the longitudinally extending surface is contracted against the tube it functions to aid in limiting the degree to which the rib may be contracted into the tube.

Another object of my invention is to eliminate an abutment shoulder in the coupling body against which the end of the tube may abut, whereby the tube may move longitudinally with the sleeve as the sleeve contractibly engages the tube.

Another object of my invention is to prevent the sleeve from shearing or "plowing" up an annular ridge of appreciable size around the tube in advance of the leading end of the sleeve by permitting the tube to longitudinally move along with the sleeve as it contracted about the tube.

Another object of my invention is to provide at the rearward end of the sleeve a plurality of contractible segmental fingers which are adapted to be contracted into gripping relation with the tube as the nut is tightened.

Other objects and a fuller understanding of my invention may be had by referring to the following description and claims, taken in combination with the accompanying drawing, in which:

Figure 1 is an enlarged side view of a tube coupling embodying the features of my invention, the upper part being shown in section to illustrate the relationship of the parts prior to the time that the nut is tightened;

Figure 2 is a fragmentary view of Figure 1 and shows the relationship of the parts after the nut is tightened;

Figure 3 is a cross-sectional view taken along the line 3—3 of Figure 2, and illustrates the disposition of the rearwardly extending segmental fingers which grippingly engage the tube when the nut is tightened;

Figure 4 is a fragmentary cross-sectional view of a sleeve which has the segmental fingers removed and which may replace the sleeve of Figures 1 and 2; and Figure 5 shows the sleeve of Figure 4 used in the reverse order and is adapted to be cammed or deflected into the tube by the nut;

With reference to Figure 1 of the drawing, my invention comprises generally a coupling body 11, a coupling nut 12, and a contractible sleeve 13 adapted to contractibly engage a tube 10.

The coupling body 11 is provided at its right-hand end with male threads 14 which are adapted to be threadably engaged by female threads 15 provided in the nut 12 for pressing the sleeve into engagement with the tube. As illustrated, the coupling body 11 is provided with a first entrance flare 17 and a second entrance flare 18 to receive the tube. The second entrance flare 18 comprises a counterbore having an annular tapered wall section with a very small taper in the order of 1 or 2 degrees into which the end of the tube is wedgingly received to provide a tube seal with the coupling body. The first entrance flare 17 has an annular tapered wall section and extends outwardly toward the end 16 of the coupling body from the counter bore 18. The taper of the first entrance flare 17 may be in the order of 10 to 12 degrees measured with respect to the longitudinal axes of the tube.

The sleeve 13 comprises a continuous annular body 25 provided with rearwardly extending segmental fingers 26 which grip the tube when the nut 12 is tightened. The sleeve is constructed of steel capable of being quench hardenable throughout its entire mass and thereafter tempered or drawn back to a hardness value greater than that of the tube. I find that steel known as 4140, heat treated throughout its entire mass and tempered to a hardness value of approximately 30 to 50 Rockwell, is satisfactory for my sleeve. Experience shows that sleeves made of low carbon steel and surface hardened, for example, by a cyanide potassium process is unsatisfactory, for the reason that such sleeves do not have a substantially non-contractible portion to limit the extent the leading edge may be deflected or cammed against the sleeve. The "hit home" feeling is absent in such sleeves and the operator is apt to cut the tube off or at least greatly deform the tube.

In the manufacture of the sleeve, the fingers 26 are provided by making slots 27 in the rearward section thereof at annularly spaced intervals thereabout. In Figure 3, I show four slots, but any other number may be used. The continuous annular body 25 has a first or leading end 28 and a second or rearward end 29. As illustrated, the end 29 constitutes the forward terminus for the slots 27. The leading end 28 is provided with an internal annular rib 30 which has two converging side walls 33 and 34 that meet to define an annular edge 32 which is adapted to be embedded into the tube when the sleeve is pressed into the first entrance flare 17 by the nut 12. The side wall 33 constitutes a part of the first or leading end of the sleeve and merges with an outer annular cam surface 40 which constitutes the other part of the leading end of the sleeve. On the rearward side of the rib, the sleeve is provided with an internal relief bore having a longitudinally extending wall 35 which extends rearwardly from the rib 30 and merges into a cylindrical wall 31 at the rear end section of the continuous annular body. The relief bore is thus defined by the side 34 of the rib 30 and the longitudinally extending wall 35. The intermediate part of the entire sleeve, that is, the rearward end of the continuous annular body 25 and the forward end of the segmental fingers 26 is enlarged to provide a tapered or cam shoulder 36 against which a cam shoulder 37 of the nut engages for pressing the leading end 28 of the sleeve into the first entrance flare 17 and for contracting the segmental fingers 26 about the tube.

In operation, as the sleeve is pressed forward by the tightening of the nut, the outer annular cam surface 40 of the sleeve forcibly engages the tapered wall section of the first entrance flare and thereby produces a camming action which cams or deflects the leading end of the sleeve against the tube. The camming action embeds the rib into the tube which resists longitudinal pull of the tube from the sleeve. Inasmuch as the end of the tube wedgingly fits within the second entrance flare which is of a very slow taper, the tube is permitted to move along with the sleeve as the rib becomes imbedded into the tube. Thus, the end of the tube may move from point 21 to point 22 of Figure 2 during the tightening of the nut, the point 21 being the place where the end of the tube becomes arrested when it is manually inserted therein by the operator. The second entrance flare of counterbore 18 is sufficiently long that the end 20 of the tube never abuts against the shoulder 19 of the coupling body. Since the tube may move with the sleeve, I prevent the sleeve from shearing or "plowing up" an annular ridge of appreciable size around the tube in advance of the leading end of the sleeve. When the longitudinally extending surface 35 of the relief bore engages the tube, it functions to aid in limiting the degree to which the rib may be embedded into the tube. The sleeve has a minimum or weakened wall thickness at the junction 23 where the side wall 34 of the rib and the relief bore wall 35 meet which is located next adjacent the rearward side of the rib, whereby a hinged action is produced so that the leading end of the sleeve and the rib constitute a readily contractible portion which may be cammed or deflected inwardly against the tube notwithstanding the fact that the sleeve is constructed of a quench hardenable steel having a high carbon content as distinguished from a low carbon steel. The wall thickness of the sleeve, beginning at the junction 23 gradually increases as advancement is made in a rearward direction toward the cylindrical wall 31 where the wall thickness becomes a maximum. The wall thickness, as it approaches a maximum, becomes sufficiently strong as to present a substantially non-contractible portion which is disposed next adjacent to and merges with the readily contractible portion at the leading end portion of the sleeve. Both the readily contractible portion and the substantially non-contractible portion are disposed to be pressed against the internal annular cam surface of the first entrance flare 17 in the order named. As the sleeve is initially pressed into the first entrance flare 17, the readily contractible portion cams or deflects inwardly against the tube for gripping the tube against longitudinal pull from the coupling body 25. As the sleeve is further pressed into the entrance flare 17, the substantially non-contractible portion resists further inward contraction of the sleeve, the resisting action limiting the amount that the sleeve may be pressed into the entrance flare 17, and thereby producing a "hit home" feeling to the tightening of the nut. The substantially non-contractible portion of the sleeve prevents the leading end or contractible portion from collapsing or inwardly buckling the wall of the tube. As resistance to longitudinal pressing movement of the sleeve is encountered, the cam shoulder 37 of the nut presses against the cam shoulder 36 of the sleeve and contracts the segmental fingers 26 against the tube for giving support to the tube against vibration. The fingers are disposed to spring back from the tube when the nut is released or disengaged.

The engagement of the sleeve against the tube and against the entrance flare 17 provides the main seal against high fluid pressure, as distinguished from the tube or secondary seal afforded by the end of the tube wedgingly fitting into the slow tapered bore 18. Notwithstanding the fact that the tube or secondary seal may allow the escape of fluid which is blocked or sealed by the main seal, yet the tube or secondary seal acts as a buffer to dampen high peak transient fluid shocks from effectively reaching the main seal.

In my fitting, the tube and sleeve may be repeatedly disconnected from and re-connected to the coupling body. Upon each re-connection the sleeve re-seats itself for sealing purposes as there is a certain amount of small give or yielding to the substantially non-contractible portion and the entrance flare 17. The "hit home" feeling which the operator senses upon the tightening of the nut for the initial installation or for the re-coupling installations is definte enough to indicate to the operator to cease attempting to turn the nut on any further.

In Figure 4, I show a sleeve 46 with the rearwardly extending fingers removed. This sleeve is provided with a cam shoulder 47 against which the cam shoulder 37 of the nut engages. In other particulars, the sleeve 46 is the same as the sleeve 13 of Figures 1 and 2, and may be used interchangeably.

In Figure 5, I show the sleeve 46 used in the reverse order on the tube, in that the leading end 28 of the sleeve is cammed or deflected inwardly against the tube by a tapered annular section 55 of the nut 51. The coupling body 50 is provided with a conical surface 52 against which the tapered shoulder 47 abuts to make a fluid seal. The end of the tube extends into a straight counterbore 53 and abuts against a shoulder 54. In assembly, when the nut 51 is turned on, the camming surface 55 of the nut cams or deflects the leading end 28 of the sleeve against the tube.

There is no longitudinal relative movement between the sleeve and the tube as the nut is tightened and thus the sleeve does not shear or "plough up" an appreciable ridge as the rib is embedded in the tube.

The views of the drawings are drawn about three times actual scale. In actual practice for a ½-inch tube, the radial depth of the internal rib 30 is approximately 15 thousandths of an inch, the maximum wall thickness at the cylindrical wall section 31 is approximately 40 thousandths of an inch, and the minimum wall thickness is approximately 25 thousandths of an inch. For a ½-inch tube, a wall thickness of 40 thousandths of an inch at the cylindrical wall section having a Rockwell value of approximately 45, is substantially non-contractible whereas a wall thickness of 25 thousandths of an inch at the leading end is contractible.

In all the forms of the sleeves shown in the drawing, the continuous annular body is provided at its forward end with a readily contractible portion for gripping the tube and with a substantially non-contractible portion immediately in rear thereof to limit the extent that the gripping portion may grip the tube. Another feature which is common to all of the figures is the fact that the end of the tube wedgingly fits into a slow taper which allows the tube to slightly stick thereinto, whereby during the assembly of the fitting there is assurance that the tube extends beyond the sleeve and into the coupling body when tightening the nut.

Another feature which marks the present sleeves is the fact that they are constructed of steel capable of being quench hardenable throughout their entire mass and thereafter tempered to a hardness value greater than that of the tube, taken in combination with the fact that the leading end section of the sleeves is physically made thin or weak enough to cam or deflect inwardly to grip the tube, notwithstanding the fact that the steel is hard and strong.

Although I have described my invention with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In a coupling device for a tube, first and second coupling members adapted to be connected together, said first coupling member having a passageway to receive the tube and an internal annular cam surface at the entrance of the passageway, said second coupling member having an inner annular surface terminating in an internal annular clamping shoulder, a contractible sleeve of harder material than the tube and having a bore to receive the tube and comprising a continuous annular body having at its forward end an outer cam surface for camming into said annular cam surface of the first coupling member, said sleeve having at its forward end on its inner surface an internal substantially V-shaped rib with forward and rearward sides defining a cutting edge to bite into the tube and make a sealing engagement therewith, said sleeve on its inner face having a longitudinally recessed wall extending outwardly from the bore thereof and meeting with the rearward side of the rib to define a relief bore, said sleeve having an external shoulder adapted to be engaged by the clamping shoulder of the second coupling member, whereby when the coupling members are drawn together the outer cam surface at the forward end of the sleeve is cammed into the internal annular cam surface of the first coupling member for forcing the rib into the tube and contracting the recessed wall in substantial alignment with the said bore, said recessed wall on the inner face of the sleeve having a greater length than the rearward side of the rib and meeting with said rearward side of the rib to define a minimum sleeve wall section at a place substantially opposite where the outer cam surface of the sleeve engages the internal annular cam surface of the first coupling member, the wall thickness of the sleeve at said minimum section being sufficiently thin to allow the rib to be cammed inwardly and bite the tube and to permit the recessed wall to be contracted in substantial alignment with the bore.

2. In a coupling device for a tube, first and second coupling members adapted to be connected together, said first coupling member having a passageway to receive the tube and an internal annular cam surface at the entrance of the passageway, said second coupling member having an inner annular surface terminating in an internal annular clamping shoulder, a contractible sleeve of harder material than the tube and having a bore to receive the tube and comprising a continuous annular body and a plurality of segmental contractible fingers integrally anchored to and extending rearwardly from the continuous annular body, said continuous annular body having at its forward end an outer cam surface for camming into said annular cam surface of the first coupling member, said annular body having at its forward end on its inner surface an internal substantially V-shaped rib with forward and rearward sides defining a cutting edge to bite into the tube and make a sealing engagement therewith, said sleeve on its inner face having a longitudinally recessed wall extending outwardly from the bore thereof and meeting with the rearward side of the rib to define a relief bore, said fingers at their anchored ends having provided thereon an external cam shoulder having a longitudinal length less than that of the fingers, the rearward portion of said fingers which extends rearwardly away from the cam shoulder being contractible about the tube, said external cam shoulder on the said fingers being adapted to be engaged by said clamping shoulder of the second coupling member, whereby when the coupling members are drawn together the said outer cam surface is cammed into the said internal annular cam surface to force the said rib into the tube and the said rearward portion of the fingers are contracted about the tube, said sleeve being composed of steel heat treated through its entire mass to render it resilient and harder than the tube, said rearward portion of the fingers in their contracted position being radially spaced from and unsupported by the second coupling member and having sufficient resiliency to support the tube against vibrations tending to disturb said sealing engagement, said recessed wall on the inner face of the sleeve having a greater length than the rearward side of the rib and meeting with said rearward side of the rib to define a minimum sleeve wall section at a place substantially opposite where the outer cam surface of the sleeve engages the internal annular cam surface of the first coupling member, the wall thickness of the heat treated sleeve at said minimum section being sufficiently thin to allow the rib to be cammed inwardly and bite the tube and to permit the recessed wall to be contracted in substantial alignment wtih the bore.

3. A contractible sleeve provided with a bore to receive an insertable member having a substantially cylindrical outer surface, said sleeve comprising a continuous annular body having at one end thereof a contractible ring portion, said contractible ring portion having on its inner surface an internal substantially V-shaped rib with first and second sides defining a cutting edge to bit into the insertable member, said contractible ring portion on its inner face having a longitudinally recessed wall extending outwardly from the bore thereof and meeting with the second side of the rib to define a relief bore, said contractible ring portion having an outer cam surface merging with said first side of the rib, said outer cam surface arranged to engage an internal annular cam surface of a connection body for camming the contractible ring portion against the insertable member, said recessed wall on the inner face of the sleeve having a greater length than the second side of the rib and meeting with said second side of the rib to define a minimum sleeve wall section at a place substantially opposite where the outer cam surface of the contractible ring portion engages the internal annular cam surface of the connection body, the wall thickness of the contractible ring portion at said minimum section being sufficiently thin to allow the rib to be cammed inwardly and bite the insertable member and to permit the recessed wall to be contracted in substantial alignment with the bore.

GEORGE V. WOODLING.

REFERENCES CITED

The following references are of record in the file of this patent:

UNITED STATES PATENTS

| Number | Name | Date |
|---|---|---|
| 2,176,127 | Lauer | Nov. 7, 1939 |
| 2,269,629 | Kreidel | Jan. 13, 1942 |
| 2,351,363 | Parker et al. | June 13, 1944 |
| 2,406,478 | Snyder | Aug. 27, 1946 |